United States Patent [19]

Edwards et al.

[11] 4,002,372
[45] Jan. 11, 1977

[54] PULVERULENT MATERIAL METERING AND DELIVERY SYSTEM AND METHOD

[75] Inventors: Joseph Franklin Edwards; Johnny Milton Brown; James Vernon Christian, all of Kingsport; Clayton Elkins, Jonesboro, all of Tenn.

[73] Assignee: General Shale Products Corporation, Kingsport, Tenn.

[22] Filed: Dec. 1, 1975

[21] Appl. No.: 636,649

[52] U.S. Cl. .............................. 302/25; 222/193
[51] Int. Cl.² ................................. B65G 53/16
[58] Field of Search ............ 222/193; 302/21, 25, 302/40, 51, 57

[56] References Cited
UNITED STATES PATENTS

| 2,391,048 | 12/1945 | Vose | 302/57 X |
| 3,186,769 | 6/1965 | Howlett, Jr. | 302/25 X |
| 3,245,725 | 4/1966 | Wildman et al. | 302/51 |

Primary Examiner—Stanley H. Tollberg
Assistant Examiner—Norman L. Stack, Jr.
Attorney, Agent, or Firm—Mason, Fenwick & Lawrence

[57] ABSTRACT

A metering and delivery system for feeding finely powdered coal to a combustion chamber includes a hopper containing finely ground coal, a vertical feed pipe extends from the hopper and a horizontal metering conduit is connected to the lower end of the feed pipe so that the coal provides a surface of repose in the metering conduit below an air flow opening with a bleed opening being downstream of the air flow opening. A venturi jet housing provides suction on the metering conduit drawing ambient air into the openings to entrain coal for injection by an injector lance into a combustion space. Metering of the coal is provided by inversely operated valves through which ambient air flows to the openings in the metering conduit.

9 Claims, 3 Drawing Figures

PULVERULENT MATERIAL METERING AND DELIVERY SYSTEM AND METHOD

This invention is in the field of pulverulent material metering and supply systems and is specifically directed in its preferred embodiment to a solid fuel metering and deliverying system for providing a metered quantity of comminuted coal or similar solid particle fuel to a kiln, boiler or similar combustion chamber.

One of the reasons that petroleum based fuels have achieved widespread acceptance and use is the fact that they can be fed to a burner assembly at a closely controlled rate for achieving optimum performance in the particular installation in which they are used. While solid fuels such as coal have substantial advantages in terms of dollar costs per BTU, such advantages have been greatly outweighed by the inability to control flow in small quantities to the burning area in the accurate manner achieved by petroleum based systems. This drawback has resulted in the ceramic industry relying almost totally upon petroleum based fuels such as natural gas for the fueling of kilns. Projected shortages of natural gas and the ever increasing costs of all petroleum based fuels have resulted in a great need for a fuel delivery and metering system for coal that can provide the high degree of control necessary in many industrial uses such as the ceramic industry in order to avoid the high cost and scarcity of petroleum based fuel. In fact, the need for a satisfactory coal delivery and metering system is particularly critical in the ceramic industry in which kilns require a large number of small burners each of which must provide an accurate temperature control in a finite zone in order to provide a satisfactory product and the high price and likely inavailability of petroleum based fuels in the future renders the provision of a satisfactory coal burner system essential to the survival of the ceramic industry.

Additionally, many other industries such as the chemical, pharmaceutical and food product industries require means capable of providing accurate quantities of powdered or comminuted materials. The inability to provide a continuous metered flow of such materials in small quantities frequently results in such industries having to employ the batch method of mixing compounds in which the components are weighed and then mixed. The present invention provides simple means which can be used to accurately provide a metered continuous flow of pulverulent or comminuted material in a continuous mixing process. The terms "pulverulent" and "comminuted" are used interchangeably throughout the specification and claims of this application in their broadest sense to include any solid powdery type material that is capable of being free-flowing. Examples of such materials include finely ground coal, coke, sand abrasive grits, pelletized plastics, flour, cornmeal, pigments, talc, granulated solids such as sugar or salt, organic compounds and many other materials of like nature which are too numerous to mention.

Therefore, it is the object of this invention to provide a new and improved pulverulent material delivery and metering system. A further object of the invention is the provision of a new and improved fuel delivery and metering system for feeding controlled quantities of coal or similar solid fuel to a combustion chamber.

Achievement of the objects of this invention is enabled by the preferred embodiment of the invention which includes a source of finely ground powdered coal comprising a material hopper from the lower end of which a vertically extending feed pipe is provided. A horizontal metering conduit is connected on one end to the lower end of the feed pipe so that finely ground comminuted coal flows down the feed pipe and into the end of the metering conduit adjacent the lower end of the feed pipe to provide a surface of repose in the metering conduit. First and second air induction openings are provided in the upper side of the metering conduit with the first air induction opening in the metering conduit consisting of a feed air induction opening positioned above the surface of repose of the powdered coal provided in the metering conduit by the gravitational movement of the coal from the infeed pipe. The upper surface of the powdered coal in the metering conduit has an angle of repose of approximately 45° and the feed air hole is immediately above this surface. The second air induction opening is a bleed air supply and is provided in the upper surface of the metering conduit immediately downstream of the feed air opening for providing a quantity of air into the metering conduit. Both the feed air induction opening and the bleed air induction opening permit the ambient air to flow into the metering conduit for a purpose to be described hereinafter.

The feed air opening and the bleed air opening are both connected to pipe risers on which interconnected feed air and bleed air control valves are mounted. A manually operable inverse adjustment means connects the feed air valve and the bleed air valve to adjust their degree of opening in an inverse manner. In other words, when the feed air valve is moved toward an open condition, the bleed air valve is moved toward a closed condition by a like or proportional amount. It is the foregoing inverse operational relationship of the feed air valve and the bleed air valve which enables a highly accurate metering of the comminuted coal particles.

The downstream end of the metering conduit is connected to a venturi housing in which an air injector is provided for creating a pressure drop through the feed air valve, the bleed air valve and the metering conduit so that ambient air flows through the feed air valve to engage the coal surface of repose and entrain coal particles therefrom. The mixture of air and coal particles is sprayed by an injector into the kiln or other area in which the combustion is to take place. The amount of air injected by the venturi serves to vary the velocity of the fuel and air mixture through the injector to vary the depth of flame penetration in the combustion chamber and also serves to increase the maximum feed rate capacity of the system. However, the metering of the fuel is accomplished by the operation of the feed air control valve and the bleed air control valve with maximum feed rate occurring when the bleed air control valve is completely closed and the feed air control valve is completely open. It is then possible to vary the fuel flow in a linear manner by operation of the fuel control valve.

A better understanding of the manner in which the preferred embodiment of the invention accomplishes the objects of the invention will be achieved when the following written discussion is considered in conjunction with the appended drawings in which.

Figure 1:
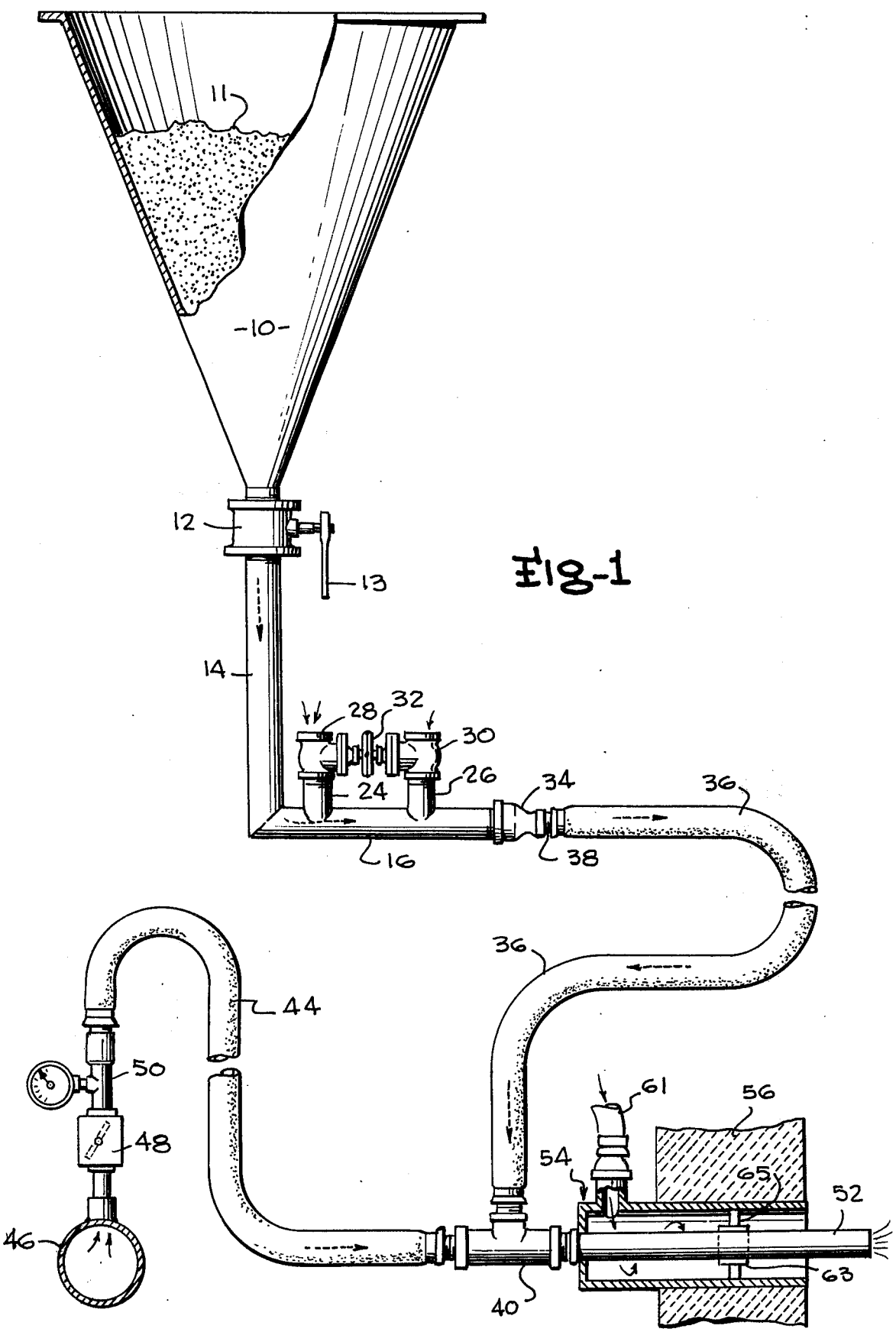
FIG. 1 is a perspective flow diagram of the preferred embodiment with portions removed for clarity.

The preferred embodiment of the invention illustrated in the drawings is directed to a fuel supply system for a kiln or the like and includes a feed hopper 10 in which a supply 11 of pulverized coal is provided. It has been found that minus 8 mesh coal of less than 3% moisture content provides highly satisfactory operation with the pulverized coal flow from the hopper flowing through a ball valve 12 which can be closed by a handle 13 when necessary to discontinue the feed of coal from the hopper for enabling repair or other maintenance operations on the remainder of the system.

A vertically extending feed pipe 14 has its upper end connected to the ball valve 12 and has its lower end connected by a smooth welded right angle junction to the upstream end of a horizontal metering conduit 16. The infeed pipe 14 and metering conduit 16 are formed of 1 inch black iron pipe cut and welded together into a smooth right angle elbow defining their junction so that gravity causes the powdered coal to flow into the end of conduit 16 and provide a stationary surface of repose 17 as shown in FIG. 2.

Figure 2:
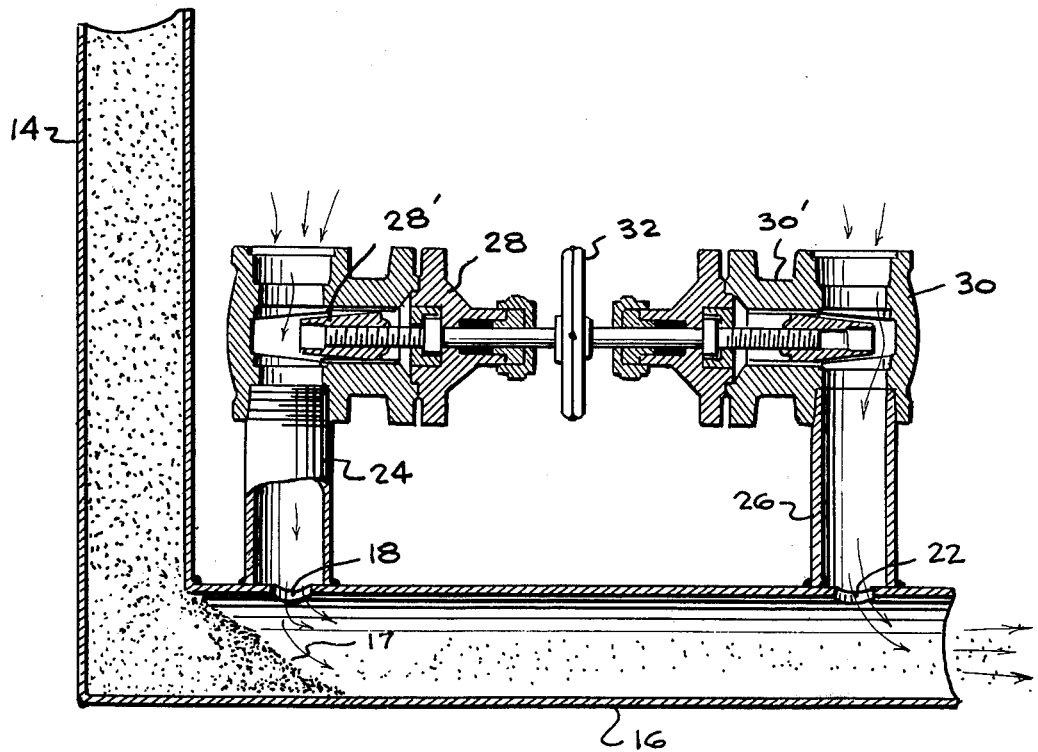
FIG. 2 is a bisecting sectional view of the feed metering portion of the preferred embodiment.

The metering conduit 16 is provided with a feed air opening 18 positioned in its top surface above the surface of repose 17 of the coal as also shown in FIG. 2. A bleed air opening 22 is spaced from the feed air opening 18 with the openings 18 and 22 being respectively communicating with pipe risers 24 and 26 which are welded to the metering conduit 16. A feed air control valve 28 is mounted on the upper end of the pipe riser 24 and a bleed air control valve 30 is mounted on the upper end of the pipe riser 26 with the opposite sides of the valves 28 and 30 being open to the atmosphere.

A manually operable valve interconnection assembly 32 is connected between the valves 28 and 30 for simultaneously opening and closing the gates 28' and 38' of valves 28 and 30 in an inverse manner. In other words, operation of the valve interconnection assembly 32 in a direction to open valve 28 will serve to cause closure of valve 30. In like manner, opening of valve 30 results in the closure of valve member 28. The valves 28 and 30 are gate valves with non-rising valve stems and are of identical construction. A reducer 34 is mounted on the end of metering conduit 16 opposite its juncture with the vertical infeed pipe 14 with a flexible hose 36 being connected by means of an adapter 38 to the metering conduit in an obvious manner.

Figure 3:
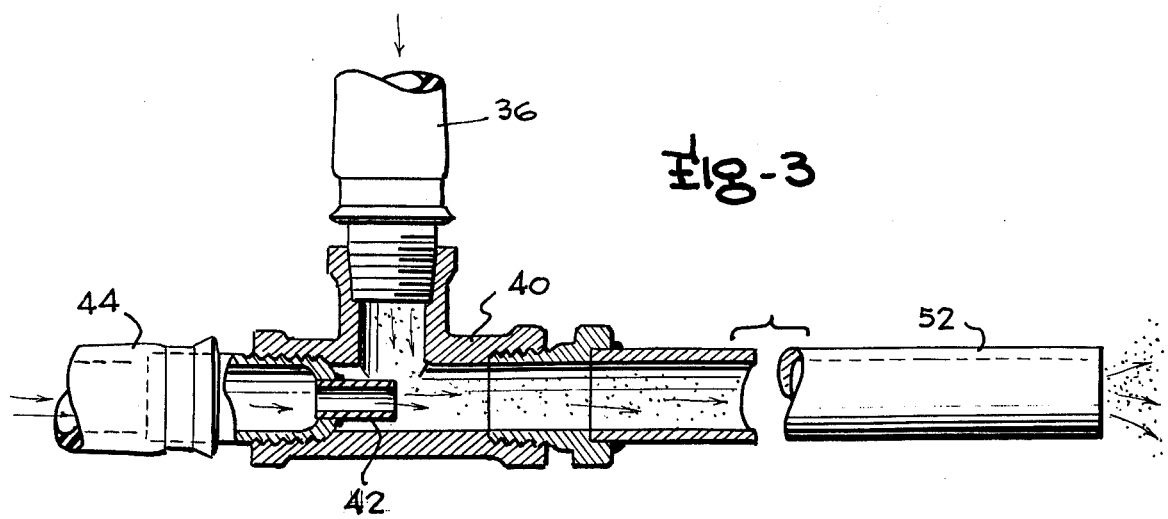
FIG. 3 is a bisecting sectional view of the venturi and injector portions of the preferred embodiment.

The opposite end of the hose 36 is connected to a venturi housing 40 in which a venturi jet 42 is provided as shown in FIG. 3. Venturi jet 42 is connected by a hose 44 to a source of compressed air consisting of a blower air header 46 connected to a butterfly valve 48 and pipe 50 to the hose member 44. All flexible hose connections are made by means of an adapter identical to adapter 38 in an obvious manner. Air injected by the venturi 42 lowers the pressure in the housing 40 in a well-known manner and induces ambient air flow through valve 28 and 30 into conduit 16. The jet from venturi 42 and coal powder from the surface 17 and induced air are directed into the upstream end of an injector lance 52 mounted in a lance holder 54 in a wall 56 of a kiln with secondary combustion air being supplied to the holder by hose 61. The lance holder 54 is in the form of a straight pipe closed at the back end except for an axial opening through which the injector lance is inserted. The axial opening serves as a rear support for the lance while a small section of pipe 63 mounted by a spider arrangement 65 downstream in the lance holder provides the forward support to keep the lance centered. An opening is provided near the rear of the lance holder at approximately 90° to the axis of the lance and intersecting the lance holder at its periphery. The purpose of this opening is to receive secondary combustion air from hose 61 which air flows around the lance into the combustion chamber in a swirling motion and also keeps the lance and lance holder cool.

The compressed air supply system can be a blower or an air compressor depending upon the feed requirements of the particular installation. In the preferred embodiment, the system works quite well with the blower capable of providing pressure no greater than 55 inches of water column downstream of the butterfly valve 48 with satisfactory operation at a pressure as low as 10 ounces per square inch being possible.

The employment of the flexible hose members 36 and 44 is not essential to the operation of the device; however, the flexibility provided by the hose members permits the injector lance 52 to be positioned as desired in one of several openings in the kiln wall and to also be easily positioned axially with respect to the kiln wall.

The injector lance 52 must be of sufficient length as to be capable of carrying the fuel mixture through the wall of the kiln to the desired point of injection into the combustion chamber. The lance should be made of material having sufficient resistance to heat to withstand the high temperatures generated in the combustion chamber in which it is used. Standard iron, stainless steel, or ceramic tubing are suitable materials for the lance in most operations.

In operation, motive air is provided from the header 46 to valve 48, conduit 50 and hose 44 to the venturi nozzle 42 from which it is ejected into the lance member 52. Operation of nozzle 42 creates a lowered pressure in the venturi housing 40 which draws air through the valves 28 and 30, metering conduit 16 and hose 36 into housing 40.

The air induced through the feed air opening 18 onto the surface of repose 17 of the coal engages the minute coal particles and entrains them in the air stream at the left end of the metering conduit 16. The powdered coal is continuously replenished downwardly through the infeed pipe 14 so that the surface 17 essentially remains in the same position at all times so as to be impinged upon by the air flowing through the opening 18. Additional air is induced through the bleed air hole 22 with the bleed air mixing with the air and coal particles and flowing through the hose 36 into the venturi housing 40 in an obvious manner. It should be understood that the total amount of air induced through the valves 28 and 30 is constant with the only variation being in the ratio of the amount provided by each of the individual valve members. Maximum fuel flow is achieved when the valve 30 is closed and all of the air is induced via the valve member 28. Minimum flow is obtained when valve 28 is closed and the air is induced through the valve 30. Consequently, by manually adjusting the valve interconnection member 32 or by the use of automatic controls, the amount of fuel fed to the injector lance 52 can be varied accurately in accordance with the particular operation being performed.

The amount of air injected by the nozzle 42 remains constant but can be increased or decreased in order to adjust the feed range of the entire assembly.

There is a linear relationship between the degree of opening of valve 28 and the air being induced by the feed air opening 18 and the resultant rate at which the fuel is conveyed away from the surface of repose 17.

Any increase in the flow of motive air through the venturi 42 increases the maximum feed rate capability of the system and simultaneously increases the exit velocity of the gas and solid fuel particles from the injector lance 52. Such an increase in the motive air flow through the venturi does not have any effect whatsoever on the ability of the solid fuel feeder assembly associated with the metering conduit 16 to control the amount of solid fuel from a maximum feed rate to a minimum flow rate in a linear manner by operation of the valves 28 and 30 as previously discussed.

It is desirable that the opening 22 be relatively close to the opening 18 in order to prevent the occurrence of a buildup or mound of powdered coal between these two openings under low flow conditions. Moreover, a close positioning of the bleed air opening 22 to the fuel air opening 18 also provides greater linearity in the flow rate variation and valve opening under flow conditions. In a typical application, pipe 14 and conduit 16 are 1 inch pipe with the spaces between the openings 18 and 22 being 4 inches. The risers are approximately 1½ inches tall and are ¾ inch size as are the gate valves 28 and 30. The hose members are ¾ inch size and the nozzle member 42 consists of a stainless steel pipe having a ⅜ inch outside diameter and a 0.035 inch thick wall.

Pipe 50 is ¾ inch size and the air pressure can be varied to any desired level. In the preferred embodiment using turbo blower air, the air pressure can be varied from zero to 24 ounces. When operating with zero air pressure, a zero amount of fuel would be fed to the injector 52 with the device being capable of feeding up to 40 lbs. of coal per hour when operating at 24 ounces of pressure. Higher pressures in the same system result in a much higher maximum feed rate. 190 pounds per hour can be fed with 12 psi compressor air. It should be understood that the dimensions of the parts and the operating pressures can vary considerably and it would be possible to provide compressed air to the inlets of the valve members 28 and 30 if desired. The dimensional and operating variations would depend upon the desired flow rates, the quality of coal being used and the nature of the particular operation. In any event, the inventive device provides a uniquely simple and effective means for varying the flow of powdered coal to a combustion chamber so as to permit the use of such fuel in low capacity fuel injection units in operations previously limited to the use of petroleum based fuels.

Consequently, the present invention meets a longstanding need of the brick and ceramic industry for means capable of burning coal under close control by the use of a large number of small volume fuel delivery devices each having a wide range of operation while being easily controlled to provide a metered fuel flow at its particular location. In addition, use of the metering and delivery system is not limited to burner operations since the system can be used for feeding practically any pulverulent material in metered quantities for mixing or other purposes.

A particular advantage of the invention is that it is economical to fabricate and maintain since it does not require special equipment and can be completely fabricated from off the shelf components. Advantages of operation of the preferred embodiment used as a burner include the fact that the exit velocity of the solid fuel from the injector lance can be varied to vary the fuel penetration into the combustion chamber. Another advantage of the inventive preferred embodiment resides in the fact that the solid fuel feed rate into the combustion chamber can be varied over a wide range without affecting the total carrying air used to delivery the fuel or the exit velocity of the fuel into the combustion chamber. The device is capable of providing a wide range of fuel feed rates while operating under low pressure air supply of between 10 to 24 ounces per square inch which makes it possible to operate by use of a turbo blower air supply as opposed to an expensive compressor system. However, the device can be used for high pressure operation if desired.

While numerous modifications of the subject invention will undoubtedly occur to those of skill in the art, it should be understood that the spirit and scope of the invention is to be limited solely by the appended claims.

We claim:

1. A solid fuel metering and delivery system for feeding particulate fuel to a combustion chamber comprising a source of finely ground solid fuel particles, conduit means extending between said source of finely ground solid fuel particles and said combustion chamber, said source of fuel particles including a feed pipe having a vertical component of axial orientation and upper and lower ends, a metering conduit having a horizontal component of orientation and an upstream end and a downstream end, said upstream end of said metering conduit being connected to the lower end of said feed pipe, the lower end of said feed pipe being full of finely ground solid fuel particles which flow outwardly into said metering conduit to provide a surface of repose of said finely groud fuel in said metering conduit, an air inflow opening in said metering conduit positioned over said surface of repose, means connected to said metering conduit at said downstream end for creating a pressure drop in said metering conduit between said air inflow opening and said downstream end so that air flows into said air inflow opening to engage said surface of repose to entrain fuel particles therefrom and convey said entrained fuel particles to said downstream end of said metering conduit for effecting the discharge of air and solid fuel particles from said downstream end into said combustion chamber.

2. The invention of claim 1 additionally including a bleed air opening in said metering conduit between said air inflow opening and said downstream end of said metering conduit.

3. The invention of claim 1 additionally including air flow valve means connected to said air inflow opening for providing a metered flow of ambient air through said air inflow opening to impinge on said surface of repose and a bleed air valve connected to said bleed air opening for providing a metered flow of ambient air through said bleed air opening into said metering conduit.

4. The invention of claim 1 additionally including a valve interconnection means for opening and closing said air flow valve means and said bleed air valve in inverse manner.

5. The invention of claim 4 wherein said means for creating a pressure drop in said metering conduit comprises a venturi jet mounted in a venturi jet housing, a source of compressed air connected to said venturi jet for supplying air to said venturi jet, valving means for varying the supply air to said venturi means and conduit means connecting said venturi jet housing to said downstream end of said metering conduit.

6. Means for providing a flow of dry powder particles at a controlled rate which can be varied comprising a metering conduit having an upstream end and a downstream end, a horizontal component of orientation, powder supplying means connected to said metering conduit for providing and maintaining a body of powder having a surface of repose in said metering conduit, a source of lower than ambient pressure connected to said downstream end of said metering conduit, a first air induction opening in said metering conduit above said surface of repose providing a flow of air engaging said surface of repose for entraining powder particles therefrom, a second air induction opening in said metering conduit spaced from said first air induction opening, first valve means and second valve means respectively mounted in communication with said first and second air induction openings and control means for said first valve means and said second valve means for opening said first valve means while simultaneously closing said second valve means by a like or proportional amount so that the total amount of air flowing through said first and second air induction openings remains constant or proportional with the percentage of air provided through the respective openings being variable in accordance with the positioning of said control means.

7. The invention of claim 6 wherein said source of lower than ambient pressure comprises a venturi housing, a venturi jet in said housing and a source of compressed air connected to said venturi jet.

8. The invention of claim 6 wherein said powdered material is coal.

9. The invention of claim 8 wherein said source of lower than ambient pressure comprises a venturi housing, a venturi jet in said housing and a source of compressed air connected to said venturi jet.

* * * * *